(12) United States Patent
Antonov

(10) Patent No.: US 6,336,890 B1
(45) Date of Patent: Jan. 8, 2002

(54) METHOD FOR EFFECTING A RATIO SHIFT, AND TRANSMISSION DEVICE FOR IMPLEMENTING SAME

(75) Inventor: Roumen Antonov, Paris (FR)

(73) Assignee: Antonov Automotive Technologies, B.V. (NL)

( * ) Notice: Subject to any disclaimer, the term of this patent is extended or adjusted under 35 U.S.C. 154(b) by 0 days.

(21) Appl. No.: 09/666,566

(22) Filed: Sep. 21, 2000

Related U.S. Application Data

(62) Division of application No. 09/029,122, filed as application No. PCT/FR96/01291 on Aug. 16, 1996.

(30) Foreign Application Priority Data

Aug. 24, 1995 (FR) .............................................. 95 10037

(51) Int. Cl.[7] .............................................. B60K 41/22
(52) U.S. Cl. ........................................ 477/80; 477/175
(58) Field of Search .............................. 477/79, 80, 70, 477/174, 175, 69

(56) References Cited

U.S. PATENT DOCUMENTS 3,922,910 A * 12/1975 Dickinson ................... 73/118.1
5,213,551 A * 5/1993 Antonov ...................... 475/257
5,263,906 A * 11/1993 Antonov ...................... 475/257
5,441,463 A * 8/1995 Steeby .......................... 477/79
5,508,916 A * 4/1996 Markyvech et al. ....... 477/80 X
5,683,328 A * 11/1997 Schepper et al. .......... 477/80 X
5,803,868 A * 9/1998 Kono et al. .............. 477/175 X
5,906,556 A * 5/1999 Harada et al. ........... 477/175 X

* cited by examiner

*Primary Examiner*—Charles A Marmor
*Assistant Examiner*—Ha Ho
(74) *Attorney, Agent, or Firm*—Kenyon & Kenyon

(57) ABSTRACT

A device and a method of controlling a progressive change of an overall transmission ratio from an old transmission ratio to a new transmission ratio are described. The method is applicable in a transmission device comprising a first and a second gear trains which are independently shiftable for determining together an overall transmission ratio of the transmission device. The method includes detecting a physical magnitude which is influenced by progressive ratio change in the second gear train, resulting in a progressive variation of said overall transmission ratio in one direction, and also includes controlling an actuator of a first selective coupling means as a function of a detected value of the physical magnitude to progressively change a transmission ratio in the first gear train in a direction contrary to the first direction.

24 Claims, 4 Drawing Sheets

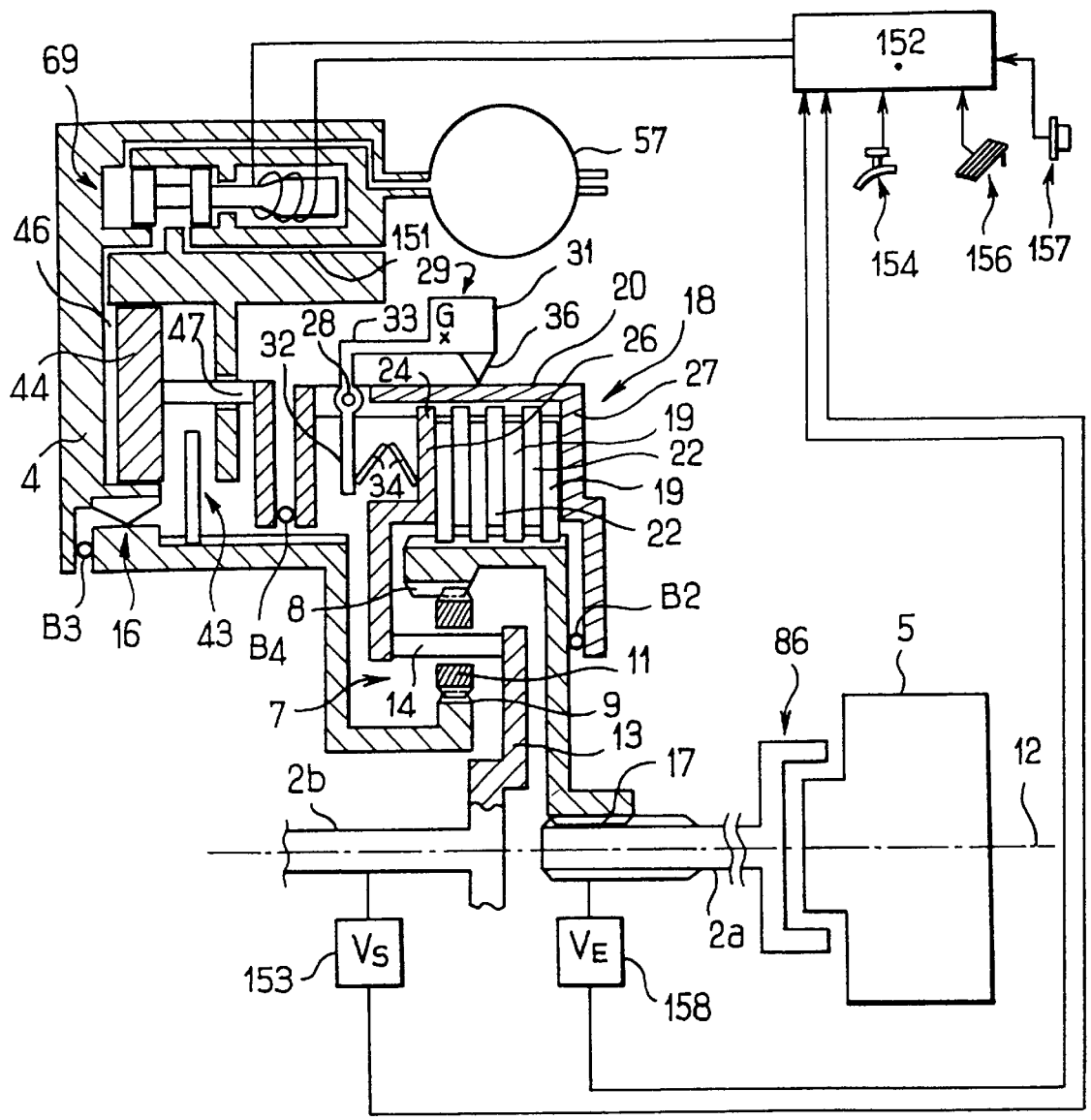
FIG_1

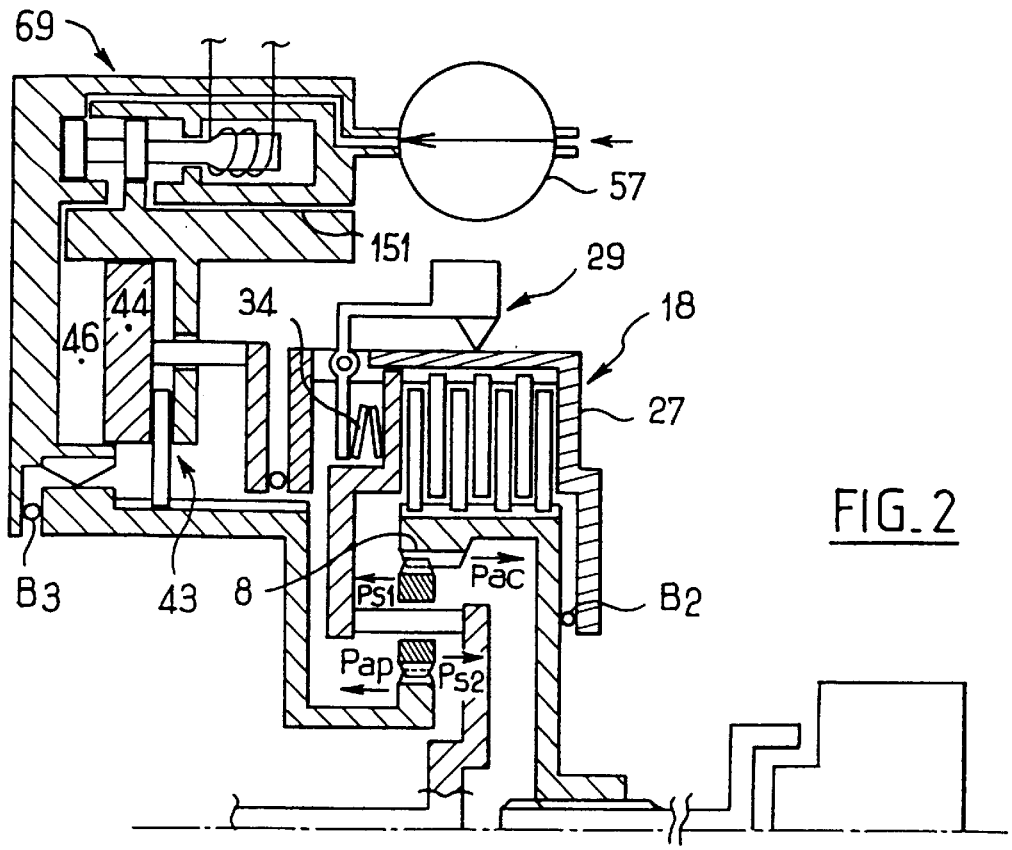
FIG_2
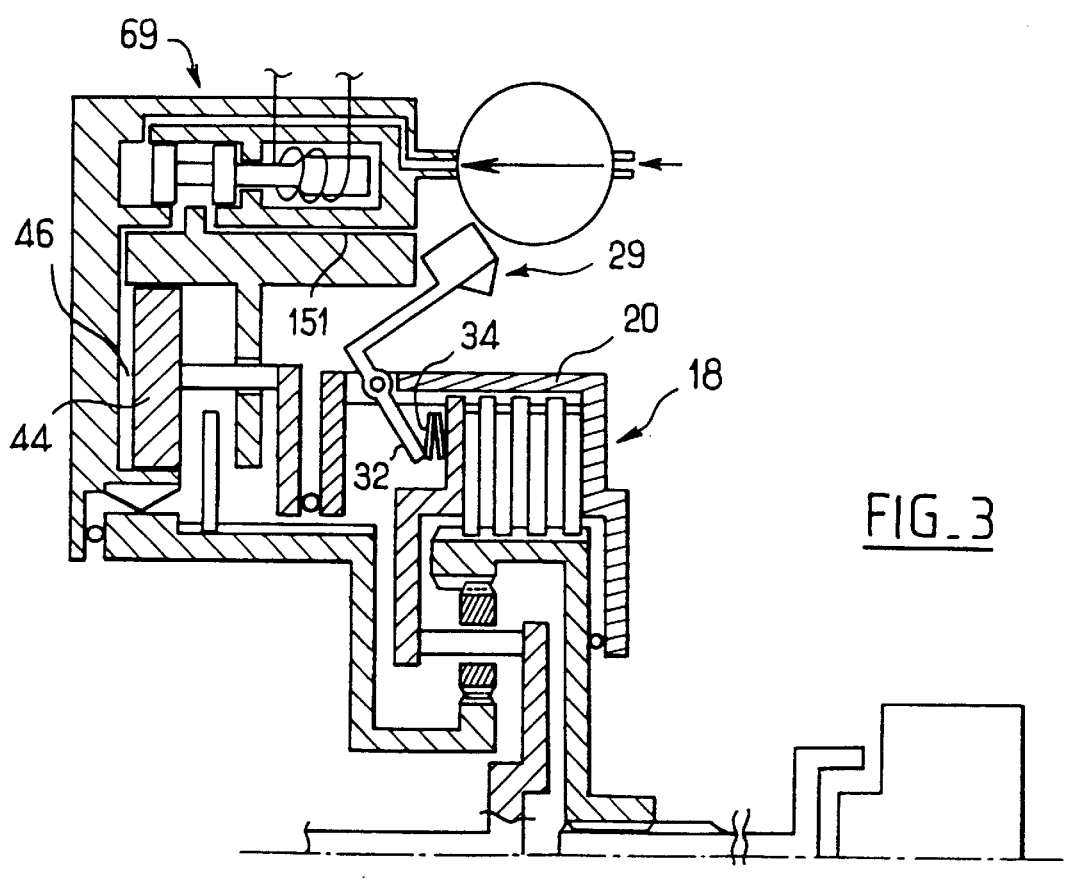
FIG_3

FIG_6

T1

| C [%] | 0 | 10 | 20 | 30 | 40 | 50 | 55 | 60 | 65 | 70 | 75 | 80 | 84 | 85 | 90 | 100 | (km/h) |
|---|---|---|---|---|---|---|---|---|---|---|---|---|---|---|---|---|---|
| | 1 | 1 | 1 | 1 | 1 | 1 | 1 | 1 | 1 | 1 | 1 | 1 | 1 | 1 | 1 | 1 | V1 |
| | 1 | 1 | 1 | 1 | 1 | 1 | 1 | 1 | 1 | 1 | 1 | 1 | 1 | 1 | 1 | 1 | V2 |
| | 2 | 2 | 2 | 2 | 2 | 2 | 2 | 2 | 2 | 2 | 2 | 2 | 2 | 2 | 1 | 1 | V3 |
| | 2 | 2 | 2 | 2 | 2 | 2 | 2 | 2 | 2 | 2 | 2 | 2 | 2 | 2 | 1 | 1 | V4 |
| | 4 | 4 | 4 | 4 | 4 | 4 | 2 | 2 | 2 | 2 | 2 | 2 | 2 | 2 | 1 | 1 | V5 |
| | 4 | 4 | 4 | 4 | 4 | 4 | 2 | 2 | 2 | 2 | 2 | 2 | 2 | 2 | 1 | 1 | V6 |
| | 4 | 4 | 4 | 4 | 4 | 4 | 4 | 4 | 4 | 4 | 4 | 4 | 4 | 2 | 2 | 2 | V7 |
| | 4 | 4 | 4 | 4 | 4 | 4 | 4 | 4 | 4 | 4 | 4 | 4 | 4 | 2 | 2 | 2 | V8 |
| | 4 | 4 | 4 | 4 | 4 | 4 | 4 | 4 | 4 | 4 | 4 | 4 | 4 | 4 | 4 | 4 | V9 |
| | 4 | 4 | 4 | 4 | 4 | 4 | 4 | 4 | 4 | 4 | 4 | 4 | 4 | 4 | 4 | 4 | V10 |
| | 4 | 4 | 4 | 4 | 4 | 4 | 4 | 4 | 4 | 4 | 4 | 4 | 4 | 4 | 4 | 4 | V11 |
| | 4 | 4 | 4 | 4 | 4 | 4 | 4 | 4 | 4 | 4 | 4 | 4 | 4 | 4 | 4 | 4 | V12 |
| | 4 | 4 | 4 | 4 | 4 | 4 | 4 | 4 | 4 | 4 | 4 | 4 | 4 | 4 | 4 | 4 | V13 |
| | 4 | 4 | 4 | 4 | 4 | 4 | 4 | 4 | 4 | 4 | 4 | 4 | 4 | 4 | 4 | 4 | V14 |
| | 4 | 4 | 4 | 4 | 4 | 4 | 4 | 4 | 4 | 4 | 4 | 4 | 4 | 4 | 4 | 4 | V15 |
| | 4 | 4 | 4 | 4 | 4 | 4 | 4 | 4 | 4 | 4 | 4 | 4 | 4 | 4 | 4 | 4 | V16 |

Vs

FIG_7

T2

| C [%] | 0 | 10 | 20 | 30 | 40 | 50 | 55 | 60 | 65 | 70 | 75 | 80 | 84 | 85 | 90 | 100 | (km/h) |
|---|---|---|---|---|---|---|---|---|---|---|---|---|---|---|---|---|---|
| | 1 | 1 | 1 | 1 | 1 | 1 | 1 | 1 | 1 | 1 | 1 | 1 | 1 | 1 | 1 | 1 | V1 |
| | 1 | 1 | 1 | 1 | 1 | 1 | 1 | 1 | 1 | 1 | 1 | 1 | 1 | 1 | 1 | 1 | V2 |
| | 2 | 2 | 2 | 2 | 2 | 2 | 2 | 2 | 2 | 2 | 2 | 2 | 2 | 2 | 1 | 1 | V3 |
| | 2 | 2 | 2 | 2 | 2 | 2 | 2 | 2 | 2 | 2 | 2 | 2 | 2 | 2 | 1 | 1 | V4 |
| | 3 | 3 | 3 | 3 | 3 | 3 | 2 | 2 | 2 | 2 | 2 | 2 | 2 | 2 | 1 | 1 | V5 |
| | 3 | 3 | 3 | 3 | 3 | 3 | 2 | 2 | 2 | 2 | 2 | 2 | 2 | 2 | 1 | 1 | V6 |
| | 3 | 3 | 3 | 3 | 3 | 3 | 3 | 3 | 3 | 3 | 3 | 3 | 3 | 2 | 2 | 2 | V7 |
| | 3 | 3 | 3 | 3 | 3 | 3 | 3 | 3 | 3 | 3 | 3 | 3 | 3 | 2 | 2 | 2 | V8 |
| | 4 | 4 | 4 | 3 | 3 | 3 | 3 | 3 | 3 | 3 | 3 | 3 | 3 | 3 | 3 | 3 | V9 |
| | 4 | 4 | 4 | 3 | 3 | 3 | 3 | 3 | 3 | 3 | 3 | 3 | 3 | 3 | 3 | 3 | V10 |
| | 4 | 4 | 4 | 4 | 4 | 3 | 3 | 3 | 3 | 3 | 3 | 3 | 3 | 3 | 3 | 3 | V11 |
| | 4 | 4 | 4 | 4 | 4 | 4 | 3 | 3 | 3 | 3 | 3 | 3 | 3 | 3 | 3 | 3 | V12 |
| | 4 | 4 | 4 | 4 | 4 | 4 | 3 | 3 | 3 | 3 | 3 | 3 | 3 | 3 | 3 | 3 | V13 |
| | 4 | 4 | 4 | 4 | 4 | 4 | 4 | 3 | 3 | 3 | 3 | 3 | 3 | 3 | 3 | 3 | V14 |
| | 4 | 4 | 4 | 4 | 4 | 4 | 4 | 4 | 3 | 3 | 3 | 3 | 3 | 3 | 3 | 3 | V15 |
| | 4 | 4 | 4 | 4 | 4 | 4 | 4 | 4 | 4 | 4 | 4 | 4 | 4 | 4 | 4 | 4 | V16 |

Vs

METHOD FOR EFFECTING A RATIO SHIFT, AND TRANSMISSION DEVICE FOR IMPLEMENTING SAME

This is a divisional of U.S. patent application Ser. No. 09/029,122, filed Feb. 23, 1998 which is a 371 of PCT/FR96/01291 Aug. 16, 1996.

The present invention relates to a method of controlling a change of ratio in a transmission device, in particular an automatic multiple-ratio transmission device.

The present invention also relates to a transmission device implementing such a method.

From WO-A-9207206 there is known an automatic transmission in which a clutch selectively connects two rotary members of a differential gearing, such as an epicyclic train, according to whether one or the other of two antagonistic forces dominates. The first force is for example a gearing reaction, more particularly an axial thrust produced by a pinion with helical teeth mounted in an axially mobile manner, tending to disengage the clutch. The second force, tending to engage the clutch, can be produced by springs and/or by a centrifugal tachometric means. When the clutch is disengaged, it is necessary to prevent the rotation of a third rotary member of the differential gearing, and this can be ensured by a free wheel preventing this third member from rotating in the reverse direction.

This type of transmission is very advantageous as its basic functioning requires neither an external power source, nor sensors, nor a control circuit. It is the transmission device itself which produces the forces which will control it and these forces are at the same time a measurement of the parameters necessary for the control.

For modern transmissions having to provide a high level of comfort and of optimisation of the operation, the previously mentioned forces are advantageously completed by additional forces, for example produced by hydraulic actuators. The additional forces can be used to modify at will the speed and torque conditions under which the transmission changes ratio, or for locking the transmission in a given ratio when this is required (PCT/FR 94/00 176).

From another aspect, it has been observed, according to the invention, that the change of ratio under the action of forces such as a centrifugal force or a gearing reaction could exhibit certain defects, such as excessive slowness.

Furthermore, when the transmission offers a number of transmission ratios which is high in comparison with the number of gear trains used, there is in general at least one ratio change process which necessitates releasing one coupling and activating another, whilst synchronising these two operations perfectly. Any imperfection in this synchronization makes the change of ratio uncomfortable for the occupants of the vehicle and introduces stresses and/or shocks, which generate wear, in the transmission.

According to US-A-4 713 984, the coupling which must be activated receives an engaging force which is at first small and then increases progressively up to the maximum value, whilst the engaging force of the other coupling is progressively released. The hydraulic means for implementing this solution are complex, expensive and difficult to perfect.

The DE-A-41 19 078 teaches to adjust the hydraulic pressure which is used for performing a ratio change in an automatic transmission, this adjustment being made as a function of the position of the gas throttle of the engine. The DE-A-41 19 078 furthermore teaches to modify the hydraulic pressure only after a certain delay in case of a variation of the position of the gas throttle, thereby to take into account the delay of variation of the engine torque as a result of the new position of the throttle. The tuning of such a system to every possible practical situation is extremely complicated, and abrupt shocks or on the contrary excessive slippings cannot be avoided with certainty. The tuning of the system depends upon the correct operation of the engine and regresses as the engine and the transmission device wear.

The purpose of the present invention is to provide better control of the ratio change process involving the actuating of at least one selective coupling means.

According to the invention, the method for controlling progressive change from an old transmission ratio to a new transmission ratio in a transmission device offering at least two transmission ratios and comprising an actuator actuating a selective coupling means of the transmission device, wherein after initiation of the ratio change process, there is detected at least one operation-related physical magnitude and the actuator is controlled according to the detected value of the physical magnitude, is characterised in that the physical magnitude which is detected is a physical magnitude which is influenced by the progressive transmission ratio change process.

Instead of taking into account parameters which influence the behaviour of the transmission, such as the load of the engine, and the influence of which has to be predicted for trying to compensate the effect thereof on the quality of the ratio change, as is made according to DE 41 19 078, the invention takes advantage from a physical magnitude which on the contrary is influenced by the ratio change which is in progress. The actuator is accordingly controlled on the basis of the actually detected effects, instead of on the basis of the presumable effects of a circumstantial parameter.

As explained in WO-A-92 07 206, the initiation of the ratio change process can be due to a spontaneous slipping of the coupling means when the torque to be transmitted exceeds the transmission capability of the coupling means subjected to a well-determined engagement force which can for example be constant or increasing with a speed of rotation.

The invention applies in particular to the case in which two selective coupling means must change state in a synchronized manner. The initiation of the ratio change process can therefore be performed by the second selective coupling means, that is to say the selective coupling means other than the one which is controlled as a function of the physical magnitude. It is then advantageous to choose as the second selective coupling means the one whose actuation causes the input speed of transmission device to vary in the sense corresponding to the ratio change to be effected. For example, if the ratio change in the process of being carried out is a change to a higher ratio, which will therefore result in a reduction of the input speed of rotation of the transmission, action is carried out such that the ratio change process begins by actuating that one of the two coupling means which causes a reduction in the input speed of the transmission. When the detected physical magnitude reaches a certain predetermined value, the actuation of the other coupling means is initiated in its turn.

As a physical magnitude characteristic of the evolution of the ratio change process, it is, more particularly in light of the foregoing considerations, advantageous to choose the input speed, or the ratio between the input speed and the output speed of the transmission, or the ratio between a speed measured upstream and another one measured downstream of the one or more coupling means whose state changes when the ratio change process is initiated.

Preferably, the coupling means are controlled on the basis of two different truth tables. When the physical magnitude passes a predetermined threshold, there is a change from the first of the truth tables, which does not provide for the actuation of the first coupling means for the vehicle's operating conditions which prevail at the time of the ratio change, to the second of the said tables, which provides for the actuation of the first coupling means for the said conditions.

According to a second aspect of the invention, there is proposed a transmission device for a vehicle comprising at least one gear train and able to change from an old transmission ratio to a new transmission ratio by actuating a selective coupling means, the device comprising initiating means to initiate a change of transmission ratio as a function of at least one operating parameter of the vehicle;

means of detecting a physical magnitude of operation; and control means for controlling the actuation of the coupling means according to the evolution of the value of the said physical magnitude, characterized in that the detection means are designed for detecting a physical magnitude which is capable of being influenced by the progressive change of transmission ratio after its initiation.

In the rest of the description, a transmission ratio will be referred to as "low" when it corresponds to a low speed at the output with respect to the input speed. In the opposite case, the ratio is referred to as "high".

Other features and advantages of the invention will furthermore emerge from the following description, given with reference to non-limitative examples.

In the accompanying drawings:

FIG. 1 is a diagrammatic half-view in longitudinal cross-section of a two-ratio transmission device according to the invention, in the rest state;

FIGS. 2 and 3 are views similar to FIG. 1 but relating to the operation as a reduction gear and as a direct drive respectively;

FIGS. 6 and 7 show two truth tables used by the flowchart of FIG. 5.

Figure 4:
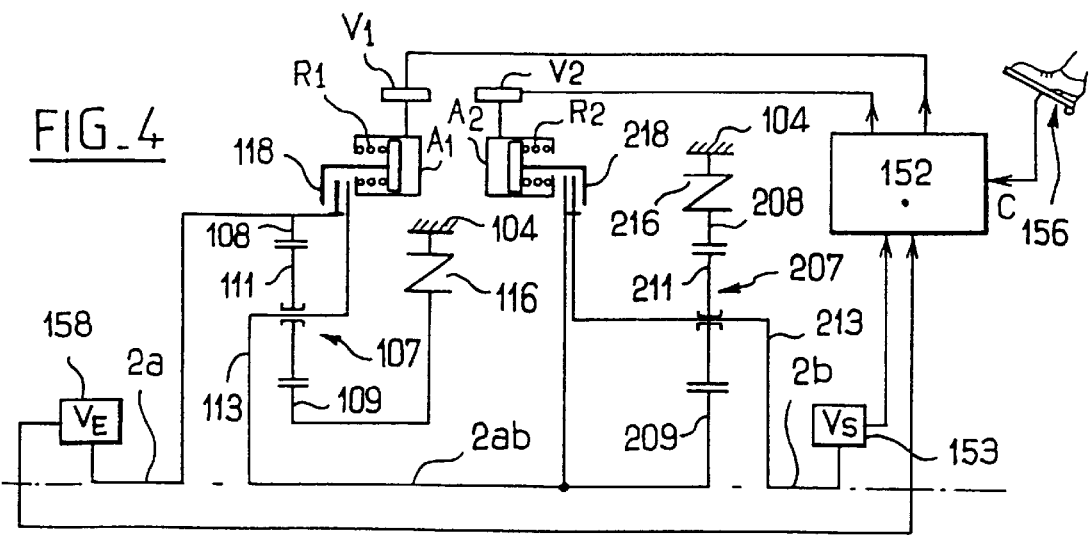
FIG. 4 is a diagrammatic half-view of a four-ratio transmission device according to the invention.

The two-ratio transmission device shown in FIG. 1, intended in particular for a motor car, comprises an input shaft 2a and an output shaft 2b in alignment with the axis 12 of the device. The input shaft 2a is connected to the shaft of an engine 5 of a motor vehicle with the interposition of a clutch 86 and possibly of other transmission means which are not shown. The output shaft 2b is intended to drive, directly or indirectly, the driving wheels of a vehicle. Between the output shaft 2b and wheels of the vehicle there can, for example, be interposed another transmission device having two or more ratios and/or a manually controlled forward drive/reverse drive reversing gear, and/or a differential for distributing movement between the driving wheels of the vehicle.

The input 2a and output 2b shafts are immobilized axially with respect to a casing 4 of the transmission device.

The transmission device comprises a differential gearing formed by an epicyclic train 7. The train 7 comprises a crown wheel 8 with internal teeth and a sun wheel 9 with external teeth, both of them meshing with planet wheels 11 supported, at equal angular intervals around the axis 12 of the transmission device, by eccentric spindles 14 of a planet wheels support 13 which is rigidly connected to the output shaft 2b. The sun wheel 9 can rotate freely about the axis 12 of the transmission device with respect to output shaft 2b which it surrounds. However, a free wheel device 16 prevents the sun wheel 9 from rotating in the reverse direction, that is to say in the direction opposite to the normal direction of rotation of the input shaft 2a, with respect to the casing 4 of the transmission.

The crown wheel 8 is rotationally locked but is free to slide axially, with respect to the input shaft 2a, by the intermediary of splines 17.

A multi-disk clutch 18 selectively couples the crown wheel 8 with the planet wheels support 13.

The stack of disks 19 and 22 of the clutch 18 can be axially clamped between a mobile plate 27 and a retaining plate 26 which is integral with the planet wheels support 13. The mobile plate 27 is part of a cage 20, which is rotationally locked with the planet wheels support 13, but able to slide with respect to the latter.

The cage 20 supports centrifugal fly-weights 29 disposed to form a ring around the clutch 18. The fly-weights are therefore rotationally locked to the output shaft 2b of the transmission device.

Each fly-weight has a solid body 31 located radially to the outside of the disks 19 and 22 and an actuating arm 32 pressed against an external face of the fixed plate 26 by the intermediary of a Belleville disk spring 34.

The rotation of the planet wheels support 13 tends to cause the bodies 31 of the fly-weights 29 to pivot radially towards the outside about their tangential axes 28, under the effect of their centrifugal force, in order to make them move from a position of rest, defined by the abutment of a stop piece 36 of the fly-weights against the cage 20 (FIGS. 1 and 2), to a separated position which can be seen in FIG. 3.

This therefore results in a relative axial displacement between the arm 32 and the axis of articulation 28 of the fly-weight. This displacement, which brings the arm 32 towards the mobile plate 27, can correspond to a compression of the Belleville disk spring 34 and/or to a displacement of the mobile plate 27 towards the fixed plate 26 in the direction of engaging the clutch 18.

When the transmission device is in the rest state as shown in FIG. 1, the Belleville disk spring 34 transmits to the cage 20, by the intermediary of the fly-weights 29 which are against their stops in the rest state, a force which engages the clutch 18 such that the input 2a of the transmission device is rotationally coupled with the output 2b and the transmission device constitutes a direct drive capable of transmitting torque up to a certain maximum defined by the engaging force of the Belleville disk spring.

Furthermore, the teeth of the crown 8, of the planet wheels 11 and of the sun wheel 9 are of the helical type. Therefore, in each pair of teeth meshed under load, opposing axial thrusts appear which are proportional to the circumferential transmitted force and therefore to the torque on the input shaft 2a and to the torque on the output shaft 2b. The direction of helical inclination of the teeth is chosen such that the axial thrust Pac (FIG. 2) arising in the crown 8 when it transmits a driving torque is applied in the direction such that the crown 8 pushes the mobile plate 27, by the intermediary of a thrust bearing B2, in the direction separating the plates 26 and 27, and therefore disengaging the clutch 18. The force Pac also tends to bring the arm 32 of the fly-weights 29 and the retaining plate 26 towards one another and therefore to keep the fly-weights in their position of rest and to compress the Belleville disk spring 34. The planet wheels 11, which mesh not only with the crown 8 but also with the sun wheel 9, are subjected to two opposing axial reactions PS1 and PS2 which balance eachother, and the sun wheel 9 is subjected to, because of its meshing with the planet wheels 11, an axial thrust Pap which is equal in value and opposite to the axial thrust Pac of the crown 8. The thrust Pap of the sun wheel 9 is transmitted to the casing 4 by the intermediary of a thrust bearing B3.

This is the situation shown in FIG. 2. Assuming that this situation is produced, the basic operation of the transmission device will now be described. As long as the torque transmitted by the input shaft 2a is such that the axial thrust Pac in the crown 8 suffices to compress the Belleville disk spring 34 and maintain the fly-weights 29 in the position of rest shown in FIG. 2, the separation between the retaining plate 26 and the mobile plate 27 of the clutch is such that the disks 19 and 22 slide against each other without transmitting torque from one to the other. In this case, the planet wheels support 13 can rotate at a speed different to that of the input shaft 2a, and it tends to be immobilized by the load which the output shaft 2b has to drive. The result of this is that the planet wheels 11 tend to behave as motion reversers, that is to say to rotate the sun wheel 9 in the direction opposite to the direction of rotation of the crown 8. But this is prevented by the free wheel 16. The sun wheel 9 is therefore immobilized by the free wheel 16 and the planet wheels support 13 rotates at a speed which is intermediate between the zero speed of the sun wheel 9 and the speed of the crown 8 and of the input shaft 2a. The unit therefore operates as a reduction unit. If the speed of rotation increases and the torque remains unchanged, a time arrives when the centrifugal force of the fly-weights 29 produces, on the mobile plate 27 with respect to the retaining plate 26, an axial engaging force greater than the axial thrust Pac, and the mobile plate 27 is pushed towards the plate 26 in order to achieve direct drive.

The clutch 18, as it becomes engaged during the change to direct drive, increasingly transmits power directly from the crown 8, which is bound with the input shaft 2a, to the planet wheels support 13, which is bound with the output shaft 2b. Consequently, the teeth of the epicyclic train 7 work less and less, that is to say they transmit less and less force. The axial thrust Pac decreases and is eventually eliminated. Thus the axial thrust due to the centrifugal force can be applied fully in order to engage the plates 26 and 27 against one another.

It can then occur that the speed of rotation of the output shaft 2b reduces and/or that the torque to be transmitted increases to the point at which the fly-weights 29 no longer provide, in the clutch 18, an engaging force sufficient to transmit the torque. In this case the clutch 18 begins to slip. The speed of the sun wheel 9 reduces until it disappears. The free wheel 16 immobilizes the sun wheel and the gearing force Pac reappears in order to disengage the clutch, such that the transmission device then operates as a reduction unit. Thus, each time a change from operation as a reduction unit to operation in direct drive occurs, or vice-versa, the axial force Pac varies in the sense of stabilising the newly prevailing transmission ratio. This is very advantageous, on the one hand in order to avoid too frequent changes of ratio around certain critical operating points and, on the other hand, in order that situations in which the clutch 18 is slipping are only transient.

As shown in FIG. 1, additional means are provided for selectively causing the transmission device to function as a reduction unit under conditions different from those determined by the axial forces due to the Belleville disk spring 34, the centrifugal fly-weights weights 29 and the helical teeth of the crown 8.

For this purpose, the transmission device comprises a brake 43 which makes it possible to immobilize the sun wheel 9 with respect to the casing 4 independently from the free wheel 16. In other words, the brake 43 is functionally fitted in parallel with the free wheel 16 between the sun wheel 9 and the casing 4. A hydraulic piston 44 is fitted in an axially sliding manner in order to apply and release the brake 43 selectively. The brake 43 and the piston 44 are of annular shape and their axis is the axis 12 of the transmission device. The piston 44 is adjacent to a hydraulic chamber 46 which can be supplied with oil under pressure selectively in order to force the piston 44 in the direction of applying the brake 43.

Furthermore, the piston 44 is rigidly connected to a push rod 47 which can press against the cage 20 by means of an axial thrust bearing B$_4$. The assembly is such that when the pressure existing in the chamber 46 is pushing the piston 44 towards the position of applying the brake 43, the cage 20, before the brake 43 is engaged, is pushed back sufficiently for the clutch 18 to be released.

Thus, when the piston 44 is in the position of applying the brake (FIG. 2), the sun wheel 9 is immobilized even if the planet wheels support 13 is tending to rotate faster than the crown 8, as is the case when the engine operates to retard the vehicle, and consequently the unit operates as a reduction unit, as allowed by the disengagement of the clutch 18.

The assembly 43, 44, 46, 47 which has just been described therefore constitutes a means which can be made available to the driver of the vehicle to force the unit to operate as a reduction unit when the driver wishes to increase the engine braking effect, for example when descending, or when he wishes to increase the drive torque on the output shaft 2b. When the torque is a driving torque, the brake 43, if it is engaged, applies a redundant action with that of the free wheel 16, but this is not disadvantageous.

The supplying and draining of the chamber 46 are controlled by an electro-valve 69. When it is in the rest state, the electro-valve 69 (FIGS. 1 and 3) connects the chamber 56 with a leakage path 151 which is hydraulically resistant. When the electro-valve 69 is electrically powered (FIG. 2), it isolates the chamber 46 from the leakage path 151 and connects it to the outlet of a pump 57 driven by the engine 5. Independently of the state of the electro-valve 69, the pump 57 can also be used to supply a lubrication circuit (not shown) of the transmission device.

The electro-valve 69 is controlled by a control unit 152 connected to a detector 153 detecting the speed Vs of the output shaft 2b, a detector of the position of a "manual/ automatic" selector 154 made available to the driver, a detector of the position of the accelerator pedal 156 and a "normal/sport" selector 157 making it possible for the driver to choose between two different automatic behaviours of the transmission device.

According to the present invention, an additional detector 158 detects the input speed V$_E$ on the shaft 2a. At least when the device is functioning in direct drive, and consequently the piston 44 is not actuated, the control unit 152 monitors the ratio between the input speed V$_E$ and the output speed V$_S$. As long as direct drive is occurring, this ratio is equal to 1. If the input speed V$_E$ increases with respect to the output speed V$_S$, this means that the clutch 18 starts to slip and consequently the transmission device has spontaneously initiated a change to functioning as a speed reduction unit. In this case, in order to accelerate this process and to limit the duration of slipping of the disks 19 and 22 of the clutch, the control unit 152 which has detected the increase in V$_E$ with respect to V$_S$ commands the supply of the chamber 46 such that the piston 44 pushes the cage 20 in the direction of disengaging the clutch 18 in order to end in the position shown in FIG. 2. For example, the control unit 152 can cause the action of the piston 44 to begin when the ratio $V_E/V_S$ becomes greater than 1.1.

In order that this function of the control unit 152 may be compatible with its other functions taking account of other operating parameters of the vehicle, it is advantageous that the control unit 152 should have in its memory two truth tables saying if the piston 44 must be activated, as a function of the operating parameters provided by the detectors 153, 154, 156 and 157. When the control unit 152 detects that the ratio $V_E/V_S$ exceeds the said threshold, for example equal to 1.1, the control unit changes from the first truth table to the second truth table. For the operating conditions in force, the first truth table provided for the non-activation of the piston 44 whilst the second one provides for the activation of the piston 44 for the same conditions.

In a slightly different version, it is possible for the control unit 152, when it detects that the ratio change process is complete, to suppress the activation of the piston 44. The detection of the completion of the ratio change process consists, for example, in detecting that the ratio $V_E/V_S$ reaches the value, for example 1.4, corresponding to operation as a speed reduction unit. Suppression of the activation of the piston 44 does not causes a return to operation in direct drive since the operation as a reduction unit has caused the reappearance of the gearing forces Pac capable of stabilising the functioning as a reduction unit without the assistance of the piston 44.

In the embodiment shown in FIG. 4, the transmission device, represented diagrammatically, comprises two planet gear trains 107, 207 mounted in series. The planet gear train 107 is similar to the one described with reference to FIGS. 1 to 3 in the sense that its crown 108 is connected to the input shaft 2a, its sun wheel 109 is connected to the casing 104 by the intermediary of a free wheel 116, and its planet wheels support 114, supporting planet wheels 111 meshing with the crown 108 and with the sun wheel 109, is connected to the output shaft 2ab of the train 107 which is also the input shaft of the train 207. A clutch 118 makes possible the selective coupling of the crown 108 with the planet wheels support 113, in other words the input shaft 2a with the intermediate shaft 2ab in order to produce direct drive in the planet gear train 107. When the clutch 118 is disengaged, the planet gear train 107 operates as a reduction unit, the sun wheel 109 then being immobilized by the free wheel 116. The reduction ratio provided by such a planet gear train, that is to say a planet gear train with the input connected to the crown and the output connected to the planet wheels support, is commonly of the order of 1.4.

The second planet gear train 207 is different in that its input shaft, constituted by the intermediate shaft 2ab, is not connected to the crown 208 but to the sun wheel 209. The crown 208 is connected to the casing 104 by the intermediary of a free wheel 216 preventing the crown 208 from rotating in the reverse direction. The output shaft 2b is connected to the planet wheels support 213 supporting planet wheels 211 each meshing with the crown 208 and the sun wheel 209. A clutch 218 makes it possible to firmly connect the intermediate shaft 2ab to the output shaft 2b in order to produce direct drive in the second differential mechanism 207.

When the clutch 218 is disengaged, the mechanism 207 operates as a reduction unit with the crown 208 immobilized by the free wheel 216. Taking account of the fact that the input is connected to the sun wheel 209 and that the output is connected to the planet wheels support 213, the reduction ratio is then typically equal to 3.

The clutches 118 and 218 are selectively engaged by springs, R1 and R2 respectively, and disengaged against the action of these springs by actuators, A1 and A2 respectively, each controlled by an electro-valve, V1 and V2 respectively, which are themselves controlled by the control unit 152.

The unit 152 receives on its inputs the signals $V_E$ and $V_S$ provided by the detectors 158 and 153 respectively and the signal from the detector 156 indicating the position of the vehicle's accelerator pedal, which corresponds to a load parameter C of the vehicle's engine, which can be expressed for example as a percentage of the maximum load.

The transmission device which has just been described is capable of providing four different ratios. The first ratio, or the lowest ratio, is established when both of the clutches 118, 218 are disengaged and consequently the two planet gear trains 107, 207 are operating as reduction units. The transmission then provides a reduction ratio equal to 1.4 ×3 =4.2.

In order to operate with the second ratio, the clutch 118 is engaged and the clutch 218 is disengaged, such that the planet gear train 107 operates as a direct drive and the planet gear train 207 operates as a reduction gear, which gives a total reduction ratio of 3 in the transmission device.

In order to operate with the third ratio, the reverse applies, the clutch 118 is disengaged and the clutch 218 is engaged, such that only the first planet gear train 107 operates as a reduction gear. This provides an overall reduction ratio of about 1.4.

In order to operate with the fourth ratio, or the highest ratio, both of the trains 107, 207 function as direct drives, the overall ratio being equal to 1.

In the simple example with is illustrated, the ratio changes are controlled only by the unit 152 in accordance with the functional parameters $V_S$ (output speed) and C (load) but more sophisticated versions are conceivable.

In this transmission device, the change from the second to the third ratio is difficult to control because the clutch 118 must be disengaged at the same time as the clutch 218 must be engaged. If the synchronisation between these two operations is imperfect, there is a risk of having, over short periods, either a simultaneous disengagement of both clutches corresponding to a return to the first transmission ratio probably with a risk of excess engine speed, or a simultaneous engagement of both clutches, that is to say a brief situation of direct drive through the whole transmission with a risk of the engine speed being too low. In both cases, the passengers in the vehicle suffer shocks and the mechanics are subjected to useless shocks and stresses. Furthermore, these functional irregularities, if they are allowed to occur, would have an effect on the functional parameters recorded by the control unit 152, which would interfere even more with the ratio change process.

In order to avoid these disadvantages, the control unit 152 firstly causes the engagement of the clutch 218 without disengaging the clutch 118. This will reduce the input speed $V_E$ with respect to the output speed $V_S$ since this corresponds to the progressive change of the transmission device from the second ratio directly to the fourth ratio. During this partial process, the input speed $V_E$ therefore changes in the sense corresponding to the required ratio change, that is to say the change from the second ratio to the third ratio. Conversely, if the clutch 118 had been actuated initially in the sense of disengaging it, an operation would have been carried out corresponding to a return to the first transmission ratio and therefore to an undesired increase in the input speed $V_E$.

The engagement of the clutch 218 occurs progressively, especially if the valve 69 comprises a hydraulically resistant leakage path 151 as shown in FIGS. 1 to 3 in order to prevent the sudden draining of the hydraulic chamber 46. Returning to FIG. 4, when during the progressive engagement of the clutch 218 the control unit 152 detects that the ratio $V_E/V_S$ falls below a certain threshold K1, it commands the disengagement of the first clutch 118.

Figure 5:
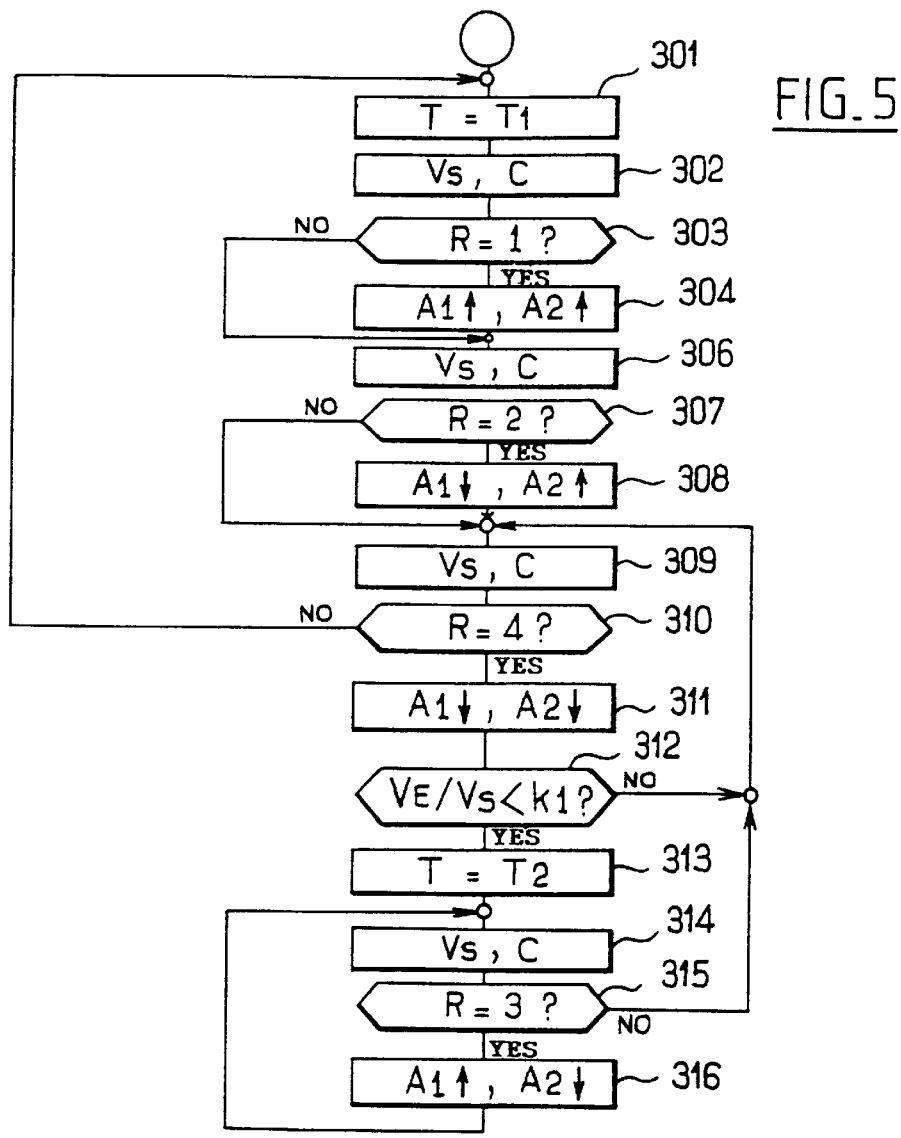
FIG. 5 shows a flowchart for the control of the transmission device of FIG. 4.

FIG. 5 shows an example of a flowchart which can be used by the control unit 152.

The first step 301 consists in selecting the truth table $T_1$ shown in FIG. 6 which indicates the ratio to be selected for different values of the load C and of he speed $V_S$. The truth table $T_1$, does not in any case provide for the selection of the third ratio; only the ratios 1, 2 and 4 can be selected.

Then, returning to FIG. 5, a test 303, preceded by a step 302 of reading the parameters $V_S$ and C, determines if, according to the table $T_1$, the ratio $R_1$, must be selected or retained. Depending on whether the answer is "yes" or "no", a command 304 to supply the actuators A1 and A2 is issued or not issued respectively. Then, in both cases, the parameters $V_S$ and C are again read (instruction 306) and a test 307 determines if all the conditions are present for establishing the second ratio. If the answer is yes, an instruction 308 commands the draining of the actuator A1 and the supplying of the actuator A2 and then, after a new reading of the parameters $V_S$ and C (instruction 309), a test 310 determines if all of the conditions are present for establishing the fourth ratio. If the answer to test 307 on the necessity of establishing the second ratio is negative, the logic passes directly to instruction 309 and to test 310 without passing through the instruction 308. If the answer to the test 310 is negative, the logic returns to test 303 in order to determine if it is necessary to establish or to retain the first ratio.

If the answer to the test 310 is positive, it is either the third or the fourth ratio which must be established, because the truth table $T_1$ does not distinguish between these two cases. But whatever the case may be, an instruction 311 commands the draining of both actuators in order to initiate the change to the fourth ratio. Then, a test 312 determines if the ratio $V_E/V_S$ is below the threshold K1. If the answer is negative, the logic returns to instruction 309 in order to check the speed and load parameters of the vehicle, $V_S$ and C respectively. If these parameters have not varied too much, the test 310 returns to instruction 311. This loop can take place several times until the progressive engagement of the clutch 218 has caused the speed $V_E$ to drop sufficiently for the answer to the test 312 ("$V_E/V_S<K1?$") to be positive. In this case, the instruction 313 commands the change to the truth table $T_2$, shown in FIG. 7, which distinguishes the cases in which the third ratio must be selected from those where it is necessary to select the fourth ratio.

After an instruction 314 for reading $V_S$ and C, a test 315 determines if the third ratio must be selected. If the answer is yes, the supply of the actuator A1 is initiated but the draining of actuator A2 is maintained (instruction 316), then the logic loops back to instruction 314.

If at a certain stage during the functioning in the third ratio the answer to test 315 becomes negative, the logic returns to instruction 309 and to test 310 to determine if the fourth ratio must be selected. If the answer is yes, shifting into, and then maintaining of the fourth ratio is carried out by looping through the successive steps 309 to 315. In fact, as the starting point is the situation in which the third ratio is already established, the answer to test 312 is immediately positive, as from the first execution of the said loop. Because, from what has been said above, it is during the transition from the second to the third ratio that the answer to test 312 changes from "NO" to "YES".

If on starting from operation in the third ratio the answer to test 315 and then the answer to test 310 are both negative, then it is necessary to establish the first or the second ratio and the logic returns to instruction 301 which reinstates the table T1 and then the process which has already been explained at the beginning of the description of FIG. 5 begins again.

For the change from the second ratio to the third ratio, the flowchart in FIG. 5 has therefore consisted in starting a process of changing to the fourth ratio, by instruction 311 for draining the two actuators. As the starting point is a situation of functioning in the second ratio for which the actuator A1 is already drained, the only effect of instruction 311 is to start the draining of the second actuator A2, and therefore to cause a change of state in the second train 207 whose jump between the two ratios (1:1 in direct drive and 3:1 as a reduction gear) is the biggest. Then, when the ratio $V_E/V_S$ becomes less than K1 (test 312), it is then the first train 107 which begins to change state through the supplying of actuator A1 (instruction 316).

In the example shown, it was not considered useful to manage the reverse change electronically, that is to say the change from the third to the second ratio, because this transition has proved less difficult in practice.

But such electronic management would have been possible. For this purpose, it would have sufficed that the table T2 made no distinction between the cases in which the first and those in which the second ratio must be established. The process of changing from the third to the second ratio would begin as if there was going to be a direct return to the first ratio, simply by releasing the clutch 218.

Then, only when the ratio $V_E/V_S$ becomes greater the a threshold K2, would occur the return to table T1 which distinguishes between the cases in which the first ratio must be selected from those in which the second ratio must be selected, and only at this stage would begin the engagement of the clutch 118 of the first train.

Consequently, it can be seen that according to the invention there is always an advantage, when it is necessary to reverse the high and low ratio states of the two gear trains mounted in series, to begin the actuation with the gear train having the biggest ratio jump between its high ratio and its low ratio. In the example, the starting point is always the actuation of the second epicyclic train 207, whose reduction ratio is three times greater when operating as a reduction gear than when operating as a direct drive, and it is only afterwards that the first epicyclic train 107 is actuated, the reduction ratio of which is only 1.4 times greater than the direct drive ratio.

In the example shown in FIG. 4, it would have been possible to bring centrifugal forces or gearing forces into play as shown in FIGS. 1 to 3.

In the truth tables such as $T_1$ and $T_2$, it would have been possible to have pairs of values C, $V_S$ for which no choice of ratio is fixed which would signify that, for these particular conditions, the control unit 152 allows the centrifugal and gearing forces alone to control the transmission device. Even in such conditions, it would be possible to make provision for the control unit 152 to control the actuating input of an actuator to favour the change of state of one or more clutches during the transition between two transmission ratios.

If the unit 152 shown in FIG. 4 must take account of parameters other than C and $V_S$ in order to decide on the choice of a ratio, the tables T1 and T2 can each be replaced by matrices with more than two dimensions.

I claim:

1. A method of controlling a progressive change of an overall transmission ratio from an old transmission ratio to a new transmission ratio, in a transmission device comprising a first and a second gear trains which are independently shiftable for determining together an overall ratio of the transmission device, said method comprising:

detecting a physical magnitude which is influenced by progressive ratio change in the second gear train, resulting in a progressive variation of said overall transmission ratio in one direction; and during said progressive ratio change in the second gear train controlling an actuator of a first selective coupling means as a function of a detected value of the physical magnitude, as influenced by said progressive ratio change, said actuator being operatively associated with said first gear train to progressively change a transmission ratio in the first gear train in a direction to at least partially counteract said progressive ratio change of said overall transmission ratio.

2. The method according to claim 1, wherein said step of controlling an actuator is performed to initiate a progressive change of the transmission ratio in the first gear train when the physical magnitude has passed a predetermined threshold value.

3. The method according to claim 1, further comprising detecting said physical magnitude by measuring a speed of rotation upstream of said first selective coupling means and comparing said speed of rotation with a speed of rotation downstream of said selective coupling means.

4. The method according to claims 1, comprising the step of allowing slipping of a second selective coupling means associated with said second gear train, when a torque transmitted by said second selective coupling means exceeds a value defined by an engagement force applied to said second coupling means, said slipping resulting in said progressive ratio change in the second gear train.

5. The method according to claim 1, comprising the step of initiating said progressive ratio change in the second gear train by progressively engaging a second selective coupling means associated with said second gear train.

6. The method according to claim 5, further comprising operating the actuator mounted thereby to contribute to release said first selective coupling means.

7. The method according to claim 6, further comprising ensuring said release of the first selective coupling means by a combined action of said actuator and of a gearing reaction force produced by teeth of the first gear train which are increasingly loaded as a torque share transmitted by the first selective coupling means decreases.

8. The method according to claim 1, further comprising causing a variation of an input speed of the transmission during said progressive change by said progressive ratio change in the second gear train, said variation being in a same sense as a sense of a variation in the overall transmission ratio resulting from said progressive change, and said step of controlling the actuator resulting in said first selective coupling means being controlled to partially counteract said variation.

9. The method according to claim 1, further comprising:

controlling a second selective coupling means in the second gear train and controlling the actuator according to truth tables at least indirectly defining coupling conditions of both said first and said second selective coupling means; and switching from one to another of said truth tables as function of a value of said physical magnitude during said progressive transmission ratio change process.

10. The method according to claim 9, wherein the switching step comprises switching from one truth table providing for direct change from the old transmission ratio to another transmission ratio, to another truth table providing for change from said other transmission ratio to said new transmission ratio.

11. The method according to claim 10, wherein said step of switching is made from said one truth table which, for a ratio change from the old transmission ratio, provides for activation of the second selective coupling means only, to said another truth table providing for activation of the first selective coupling means.

12. The method according to claim 1, wherein said two gear trains are two differential mechanisms mounted in series said first gear train offering two individual transmission ratios separated by a first ratio difference, said second gear train offering two individual transmission ratios separated by a second ratio difference which is larger than said first ratio difference.

13. A transmission device for a vehicle, having at least a first and a second gear trains independently shiftable with respect to each other for changing an overall transmission ratio of the transmission device from an old transmission ratio to a new transmission ratio, said transmission device comprising:

first selective coupling means associated with said first gear train;

a selectively controllable actuator mounted for actuation of said first selective coupling means;

variable engagement means for shifting said second gear train;

means for detecting a value of a physical magnitude influenced by a progressive change of said overall transmission ratio after initiation of said progressive change by said engagement means and;

control means for controlling actuation of said first selective coupling means thereby to progressively shift said first gear train in a direction to partly and substantially simultaneously counteract said progressive change upon detection of said progressive change through influence thereof upon said physical magnitude.

14. The transmission device according to claim 13, wherein the control means are adapted to initiate a change of energization state of said actuator when the value of said physical magnitude passes a selected threshold.

15. The transmission device according to claim 13, wherein the means for detecting the value comprise means for detecting a speed of rotation upstream of said first selective coupling means, with respect to a direction of energy transfer from an input to an output of the transmission device.

16. The transmission device according to claim 13, wherein the variable engagement means comprise means for applying to a second selective coupling means associated with said second gear train an engagement force limited such that the second selective coupling means begins to slip when a torque to be transmitted by said second selective coupling means exceeds a value determined by said engagement force.

17. The transmission device according to claim 16, further comprising tachometric means for defining said engagement force to increase with a speed of rotation in the transmission device.

18. The transmission device according to claim 16, further comprising means for transmitting to said second selective coupling means, in a direction of disengagement, a gearing reaction force undergone by teeth of a gear train that is increasingly loaded as said second selective coupling means slips.

19. The transmission device according to claim 13, wherein the control means comprise a memory containing at least two truth tables defining states of said first selective coupling means as a function of at least one operating parameter related to the progressive change.

20. The transmission device according to claim 13, further comprising damping means for slowing down actuation of at least one of said first selective coupling means and of said variable engagement means.

21. The transmission device according to claim 13, wherein the control means comprise a memory containing at least two truth tables specifying states of said first selective coupling means and of said engagement means as a function of at least one operating parameter of the vehicle, and wherein the control means comprise means for changing, as a function of the evolution of the physical magnitude, from a first table which provides for an intermediate state achievable by changing state of said engagement means while maintaining a state of the first coupling means, to a second table which provides for simultaneous change of state of said first selective coupling means and of the engagement means, with respect to states of the first selective coupling means and of the engagement means defining the old transmission ratio.

22. The transmission device according to claim 21, wherein the second truth table also defines said intermediate state for establishing a further transmission ratio when said at least one operating parameter assumes values outside a range of values corresponding to change from the old transmission ratio to the new transmission ratio.

23. The transmission device according to claim 13, wherein said first and second gear trains are mounted in series and are each capable of providing a high transmission ratio and a low transmission ratio, a jump between the high transmission ratio and the low transmission ratio being different from one gear train to the other, and wherein the old transmission ratio and the new transmission ratio are obtained by operating one of the gear trains in said high transmission ratio and another of the gear trains in said low transmission ratio.

24. The transmission device according to claim 23, wherein the control means are adapted to cause the transmission device to change from the old transmission ratio to an extreme overall transmission ratio by changing state of the variable engagement means while maintaining the state of the first selective coupling means.

\* \* \* \* \*